Figure 1:
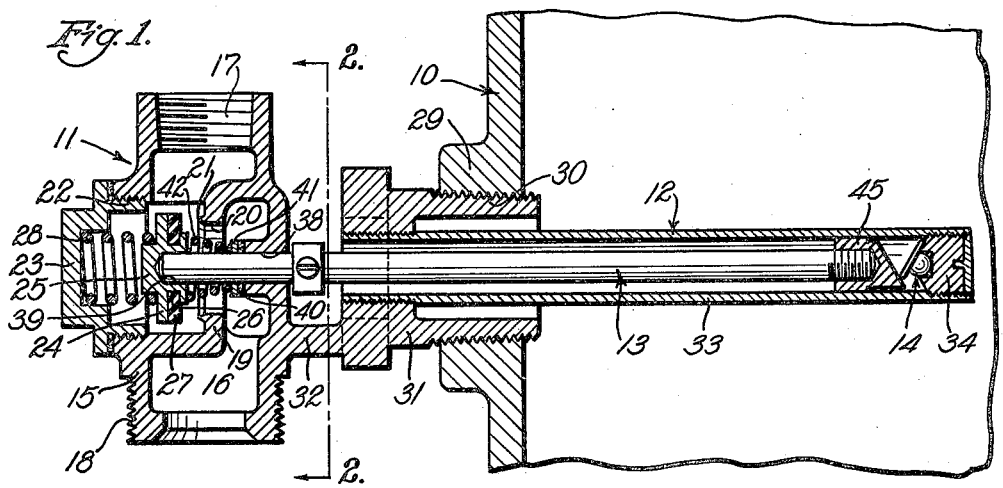

June 18, 1940.   M. W. GATHERCOLE   2,204,890
THERMALLY GOVERNED CONTROL
Filed Nov. 22, 1938   2 Sheets-Sheet 1

MEARL W. GATHERCOLE
INVENTOR.
His Attorney

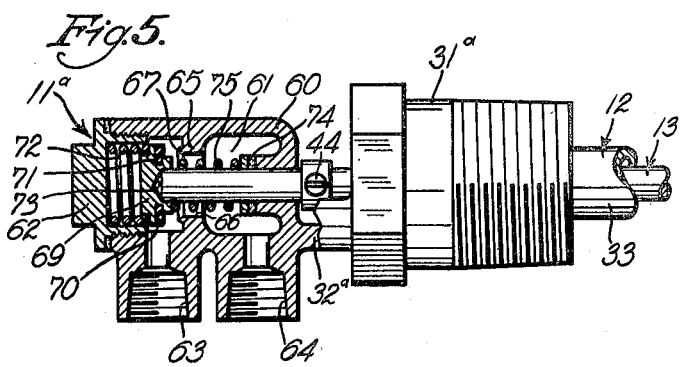
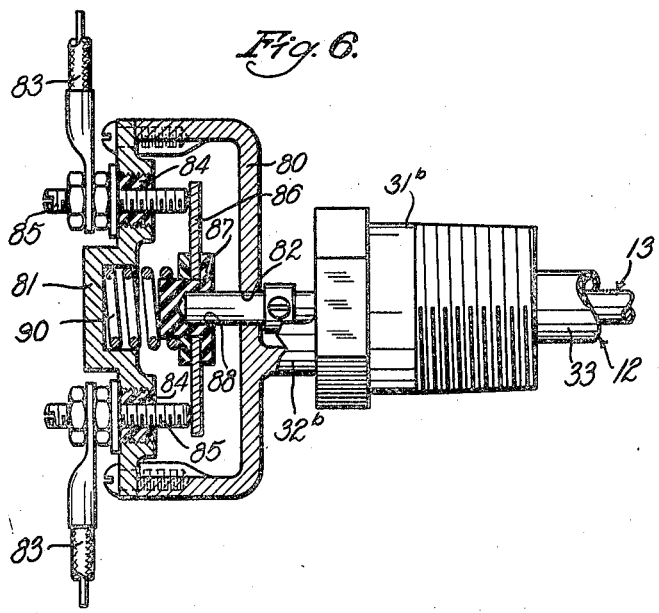

Patented June 18, 1940

2,204,890

UNITED STATES PATENT OFFICE 2,204,890

THERMALLY GOVERNED CONTROL

Mearl W. Gathercole, Los Angeles, Calif.

Application November 22, 1938, Serial No. 241,799

14 Claims. (Cl. 74—2)

This invention relates to controls and relates more particularly to thermally governed safety controls. A general object of this invention is to provide a simple, practical and dependable safety control of the character mentioned.

The present invention relates to a control having a wide range of application. The control of the present invention is thermally governed or thermally responsive, and, therefore, is suited for use in conjunction with systems, devices and apparatus where heat is employed and the control of heat is a factor. I will herein describe typical forms of the invention designed for use in conjunction with boilers, heating tanks, water heaters, etc., and adapted to control the valves, switches, etc., governing the heating means of such devices. The forms and application of the invention referred to herein and later described in detail are merely illustrative and typical of the invention, and are not to be construed as limiting either the scope or the application of the invention.

Another object of this invention is to provide a thermally responsive safety control that is sure and positive.

Another object of this invention is to provide a safety control of the character mentioned that will operate to close a valve, open a switch, close a switch, or perform similar operations when the surrounding or adjacent medium reaches a given or critical temperature.

Another object of this invention is to provide a control of the character mentioned that is unaffected by temperatures below the selected or critical temperature and is such that its parts are not moved, flexed, rotated, or in any way operated until the critical temperature is approached or reached.

Another object of this invention is to provide a control of the character mentioned that will remain conditioned for operation indefinitely and that requires no servicing or attention until it has actuated, whereupon it may be easily and quickly reset to again act as a safety control.

Another object of this invention is to provide a control of the character mentioned that is adapted to control the heating means of a boiler, water heater, or the like to be responsive to the temperature of the water in the boiler or heater to cut off the heating means when a critical temperature is approached or reached. The novel control of the present invention, when employed as just mentioned, operates to cut off the fuel supply or break the electric circuit of the heating means when the conventional thermostatic control fails to function or the manual control is not operated.

Another object of this invention is to provide a safety control of the character referred to that may be reset or reconditioned after operation without the replacement of parts and without the employment of tools.

Another object of this invention is to provide a control of the character mentioned that is not liable to be tampered with and that is not subjected to deterioration by reason of the temperature or fluids to which it is exposed.

Another object of this invention is to provide a control of the character mentioned that embodies a novel and particularly effective valve that is operable to make a complete, positive shut off or seal when operated.

A further object of this invention is to provide an efficient thermally governed control that embodies two relatively shiftable parts, one a base or body, the other an actuator and a control element interposed between the base and actuator permitting or providing for relative movement between said parts when subject to a given temperature.

Figure 2:
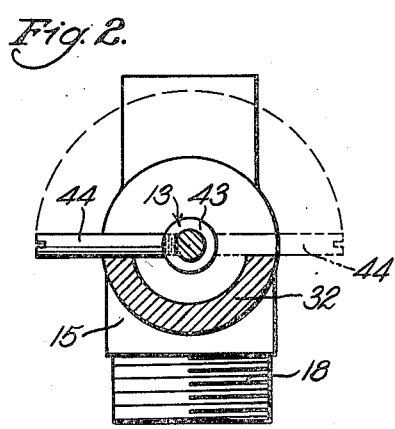
Figure 3:
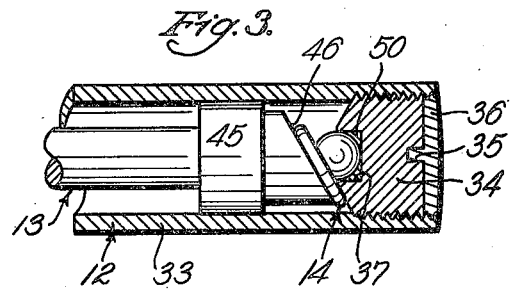
Figure 4:
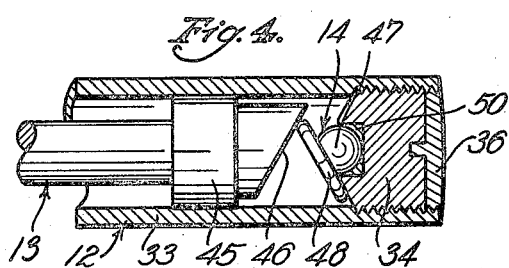

The various objects and features of my invention will be fully understood from the following detailed description of typical preferred forms and applications of the invention, throughout which description reference is made to the accompanying drawings, in which:

Fig. 1 is a central longitudinal detailed sectional view of one form and application of the control of the invention, showing the parts in the normal positions. Fig. 2 is a transverse detailed sectional view taken as indicated by line 2—2 on Fig. 1. Fig. 3 is an enlarged fragmentary longitudinal detailed sectional view illustrating the condition of certain parts upon completion of an actuation of the control. Fig. 4 is a view similar to Fig. 3 illustrating the relationship of parts following the resetting of the control. Fig. 5 is a fragmentary longitudinal detailed sectional view of another form and application of the invention with the valve parts in the normal or unactuated positions and showing certain parts in side elevation, and Fig. 6 is a longitudinal detailed sectional view of still another form and application of the invention illustrating the switch parts in the normal positions and showing certain parts in side elevation.

In Figs. 1 to 4, inclusive, of the drawings, I have illustrated the invention embodied in a form for use on a boiler, heating tank, water heater, or the like, wherein fluid fuel is employed as the heating medium. I have illustrated a portion of the tank or vessel 10 of the apparatus, which vessel may be considered as containing fluid being heated. The tank or vessel 10 and the heating means for the same form no part of the present invention and, therefore, the details of these structures have been omitted from the present disclosure.

The form or embodiment of the invention illustrated in Figs. 1 to 4, inclusive, may be said to comprise, generally, a valve 11 operable to cut off the flow of fuel for heating the vessel 10 and a control responsive to or governed by the temperature of the fluid in the vessel 10 comprising two relatively shiftable elements, namely, a base or body 12 and an actuator 13, and a control member 14 interposed between the body 12 and the actuator 13, providing for or permitting relative movement between the body 12 and the actuator 13 when the fluid in the vessel 10 reaches a given temperature whereby the actuator 13 may operate or release the valve 11 for operation.

The valve 11 may be considered as connected in the line or pipe (not shown) for conducting the fuel to the heating means or burner heating the vessel 10. The valve 11 may be varied considerably in construction and character, depending upon the manner in which it is connected in the fuel line or pipe. In the construction illustrated the valve 11 includes a valve body 15 having a passage 16 for conducting or passing the fuel. The passage 16 extends through the valve body 15 from one end to the other. The valve body 15 is provided with means for facilitating its connection in the fuel line or pipe. In the typical case illustrated one end portion of the passage 16 is provided with a thread 17 and an external thread 18 is provided on the body 15 at the opposite end portion of the passage. A partition 19 is provided in the valve body 15 and extends across the passage 16. The partition 19 has an opening 20 whose longitudinal axis is at substantially right angles to the major longitudinal axis of the passage 16. An annular valve seat 21 is provided on the partition 19 to surround the opening 20. The seat 21 is preferably in the nature of a sharp ridge presenting what may be termed a knife edge. An access opening 22 is provided in the outer wall of the valve body 15 and is closed by a threaded-in plug 23.

The valve 11 includes a valve element or valve proper engageable with the seat 21 to close the passage 16 against the flow of fuel. The valve proper includes a disc 24 provided at its opposite sides with projecting central bosses 25. A peripheral groove 26 is provided in the inner boss 25. The groove 26 is preferably quite deep and preferably has flat walls. A flexible resilient washer 27 is provided on the valve disc 24 to cooperate with the seat 21. In accordance with the invention the disc 27 is sprung or worked into the groove 26 and the washer is formed and proportioned to tightly engage in the groove by reason of its resiliency. The washer 27 may be formed of rubber, rubber composition, synthetic rubber, or the like, to have the desired flexibility and resiliency. One side of the washer 27 flatly engages against the inner side of the disc 24 while the opposite side of the washer opposes the valve seat 21. The periphery of the washer 27 is free and unconfined and is adjacent the periphery of the disc 24. It will be seen that the tight engagement of the washer 27 in the groove 26 securely retains the washer on the disc 24. The above described manner of attaching the washer 27 to the disc 24 makes it unnecessary to employ adhesive to retain the washer in place. Accordingly, the washer 27 may flatly and evenly bear against a face of the disc 24 to present a flat regular surface for engaging the seat 21. As the periphery of the washer 27 is unconfined the washer is free to spread or expand when in cooperation with the seat 21 and thus have even, full engagement with the seat.

The valve disc 24 is urged toward the partition 19 and the seat 21 by spring means. In the construction illustrated a helical spring 28 is arranged under compression between the plug 23 and the valve disc 24. The boss 25 on the outer side of the disc 24 assists in centering and retaining the spring 28 and the outer end of the spring may be received and centered in the plug 23. The spring 28 is designed to urge or force the disc 24 toward the seat 21 with substantial force and is operable to retain the washer 27 in tight sealing engagement with the seat 21 when the valve is operated or closed.

Means is provided on the valve body 15 for mounting or securing the valve 11 in position on the vessel 10. As illustrated the vessel 10 has a boss or thickened wall portion 29 and a threaded opening 30 extends through the portion 29. A tubular boss 31 is connected with the valve body 15 and is threaded in the opening 30. The boss 31 is spaced from the inner side of the valve body 15 and is connected with the valve body by a web 32. The web 32 may be a partially annular part of less than 180° extent, as best illustrated in Fig. 2. The connection between the valve body 15 and the boss 31 just described prevents leakage from the vessel 10 from entering the valve body 15 and prevents fuel leakage from the valve body from entering the vessel 10.

The base or body 12 is the fixed or stationary element of the thermally responsive control for the valve 11. The base or body 12 is adapted to extend into or to be in contact or close proximity to the material in the vessel 10. For example, in the application of the invention illustrated the body 12 extends into the tank or vessel 10. The base or body 12 includes a tube 33. The body tube 33 has its outer portion threaded in the tubular boss 31 and the outer end of the tube 33 may be open, as illustrated. The body tube 33 projects inwardly beyond the boss 31 and extends some distance into the vessel 10.

The body 12 further includes a plug or block 34 carried by the body tube 33. In the preferred construction illustrated the block 34 is in the nature of a plug threaded in the outer portion of the body tube 33, it being apparent that the block may be formed integral with the tube 33, if desired. Where the block 34 is threaded in place a screw driver slot 35 is provided in the outer end of the block. A seal 36 of solder or other suitable material seals the inner end of the tube 33 and covers the end of the block 34. The inner end of the block 34, that is, the end of the block facing the valve 11 is provided with an opening 37. In the preferred construction the opening 37 is in the nature of a central socket. The socket or opening 37 may be a simple, cylindrical bore and may have a flat bottom wall. The opening 37 is provided to receive a part of the member 14, as will be subsequently described. The inner end of the block 34 is tapered or frusto-conical, tapering away from the mouth of the opening 37. It is to be noted that the body 12 comprising the tube 33 and the block 34 is a simple, inexpensive member.

The actuator 13 is a movable element of the thermally responsive control and is associated with the valve 11 to control or actuate the same. In the form of the invention being described the actuator 13 is in the nature of a rod or stem operatively connected or associated with the valve disc 24 and carrying a part which cooperates with the member 14. The stem or actuator 13 extends centrally and longitudinally through the body tube 33 from adjacent the block 34 to the interior of the valve body 15. The stem or actuator 13 is shiftable longitudinally and is turnable. An opening 38 in the rear wall of the valve body 15 turnably and shiftably receives the actuator 13 and the actuator continues outwardly through the opening 20. The forward or outer portion of the actuator 13 is received in a socket 39 in the valve disc 24. The stem or actuator 13 is received in the socket 39 with a certain amount of clearance or play which allows or provides for a desirable freedom of movement of the valve disc 24 so that the washer 27 may evenly cooperate with the seat 21. This slight working or play of the valve disc 24 on the actuator 13 assures the effective sealing engagement of the washer 27 with the seat 21 even though the actuator 13, the opening 38 or other parts may be slightly inaccurate or misformed. It is preferred to have the actuator 13 turnable in the socket 39. The end wall or bottom of the socket 39 bears on the outer end of the stem or actuator 13 so that the above described spring 28 exerts a rearward or inward force on the actuator.

The invention includes sealing means or packing means in the valve 11 for preventing the leakage of the fluid fuel from about the actuator 13. An annular body of packing 40 is seated on an internal boss surrounding the opening 38 and a washer 41 bears against the packing 40. A coiled spring 42 surrounds the actuator 13 and is held under compression between the valve disc 24 and the washer 41 to maintain the packing 40 under compression so that it effectively seals about the actuator 13. The spring 28 is considerably stronger than the spring 42 and is operable to shift the valve disc 24 and the actuator 13 against the resistance offered by the spring 42.

Means is provided for turning the stem or actuator 13 to effect the resetting of the thermally responsive control, as will be hereinafter described. The means for turning the actuator 13 may comprise a collar 43 surrounding the actuator 13 and located between the rear side of the valve body 15 and the boss 31. A handle or lever 44 is threaded in an opening in the collar 43 and projects radially from the collar. The lever 44 may serve as a set screw for clamping the collar 43 on the actuator 13. As illustrated by the broken lines in Fig. 2 the lever 44 is adapted to be shifted through an arc of substantially 180° to turn the actuator 13 a like amount. The lever 44 is engageable with the opposite edge portions of the web 32 to limit the turning of the actuator 13 and to stop the actuator in definite or given rotative positions.

The stem or actuator 13 carries a head 45. The head 45 is provided on the inner end of the actuator 13 to be in spaced adjacent relation to the block 34 of the body 12. The actuator head 45 is suitably secured to the actuator 13, for example, it may be threaded to the actuator. A portion of the head 45 rides or shiftably bears on the internal surface of the body tube 33 to assist in supporting and guiding the actuator 13.

In accordance with the invention the end 46 of the head 45 opposing the block 34 is inclined or pitched with respect to the longitudinal axis of the actuator 13. The pitch of the end 46 is preferably substantial. The end 46 of the head 45 is flat and is preferably finished or smooth. In the preferred construction the portion of the head 45 immediately adjacent its end 46 is reduced in external diameter to be clear of the internal wall of the body tube 33.

The member 14 is interposed between parts of the body 12 and the actuator 13 to govern or provide for relative movement between the body and actuator. In the construction described, the member 14 is arranged between the actuator head 45 and the body plug 34. The control member 14 includes a partially spherical portion which I will term a ball part 47 and a disc portion which I will term a disc 48. The ball part 47 and the disc 48 are integrally or otherwise rigidly joined together. The ball part 47 closely and shiftably fits the socket or opening 37, that is, the surface of the ball part 47 has a close working fit with the side wall of the opening 37. The ball part 47 preferably "bottoms" in the opening 37 having its surface in bearing engagement with the bottom wall of the opening. It is desirable that the ball part 47 have only limited engagement with the bottom wall of the opening 37. Thus, in the case illustrated, where the bottom wall of the opening 37 is flat the ball part 47 has point contact with the bottom wall of the opening.

The disc 48 of the member 14 is external of the opening 37 being disposed in front of the block 34. The disc 48 is preferably considerably larger in diameter than the ball part 47. The opposite surfaces of the disc 48 are preferably flat and substantially parallel and the peripheral edge of the disc 48 is preferably smooth and rounded or convex. As illustrated in Figs. 1 and 4 of the drawings, the peripheral edge of the disc 48 is adapted to have contact with the pitched end 46 of the actuator head 45. The parts are related and proportioned so that the valve disc 24 is in its open position when the peripheral edge of the disc 48 is in cooperation with the end 46, as illustrated in Figs. 1 and 4. It is to be observed that the spring 28 urging the actuator 13 inwardly tends to shift or turn the member 14 when the disc 48 is angularly disposed with respect to the end 46 and has its periphery in contact with the end 46. The angle between the end 46 of the head 45 and the face of the disc 48 is preferably substantial so that the valve disc 24 may be a considerable distance away from the seat 21 to permit a free flow of fuel through the passage 16. The point of engagement between the end 46 and the peripheral edge of the disc 48 is spaced some distance from the common longitudinal axis of the actuator 13 and the member 14 so that the spring 28 exerts a considerable turning force on the member 14.

Novel thermally responsive or thermally governed means is provided for normally holding the member 14 against movement or turning so that the engagement of the end 46 with the disc 48 may normally hold the valve 11 in the open condition. Fusible material 50 is provided in the opening 37 to normally hold or restrain the member 14 against movement. The material 50 may be any selected material having a relatively low melting point and that has sufficient strength when in a solid condition to hold the member 14 against movement. The melting point of the material 50 determines the temperature at which the valve 11 closes under the action of the spring 28. Accordingly, where the device is designed or intended to close off the fuel supply to the burner of a water heater, or the like, the material 50 is such that it fuses or melts when the temperature of the fluid in the vessel 10 reaches a temperature of, say, 210° F. to provide for the closing of the valve 11. It is to be understood that the material 50 may be any suitable material that has the selected or required melting point and that quickly solidifies when the temperature falls below its melting point. In actual practice the material 50 may be an alloy having a relatively low melting point and the relative proportions of the constituents of the alloy may be varied to give the alloy the selected or preferred melting point.

The ball part 47 closely fits the opening 37 as described above to prevent the escape or leakage of the material 50 from the opening when the material is in a fluid state. It will be seen that when the material 50 melts or becomes liquid upon the fluid in the vessel 10 reaching a critical temperature the spring 28 acts to shift the actuator 13 inwardly bringing the valve washer 27 against the seat 21 and causing the member 14 to rock or turn to a position where one face of the disk 48 is flatly engaged by the end 46 of the head 45 and the other face of the disc lies against or is adjacent the tapered end of the block 34. This relationship between the parts is illustrated in Fig. 3 of the drawings.

It is believed that the operation of the form and application of the invention illustrated in Figs. 1 to 4, inclusive, of the drawings will be readily understood from the foregoing detailed description. Under normal operating conditions where the usual thermostatic control is effective or where the manual control is properly manipulated, so that the temperature of the fluid in the vessel 10 is below the critical temperature, the parts of the control and valve 11 are in the positions illustrated in Fig. 1 of the drawings. As described above, the engagement of the end 46 with the periphery of the disc 48 holds the actuator 13 in a position where the valve disc 24 and washer 27 are spaced forwardly from the seat 21 so that a free flow of fuel through the valve passage 16 is permitted. When the temperature of the fluid in the vessel 10 reaches or approaches a critical point due to the failure of the usual thermostatic control or failure to properly govern the manual control the fusible material 50 melts or liquefies and no longer resists movement of the member 14. Upon liquefaction of the material 50 the spring 28 acts to shift the valve disc 24 toward the seat 21 and to shift the actuator 13 inwardly. The spring 28 urges the valve washer 27 into tight effective sealing engagement with the seat 21 so that the flow of fuel through the valve passages 16 is completely shut off. The inward movement of the stem or actuator 13 by the spring 28 is accompanied by rocking or turning of the member 14 to a position such as illustrated in Fig. 3 of the drawings where the end 46 lies against or is parallel with the flat face of the disc 48. From the above it will be seen that the control means of the present invention assures the complete cutting off of the supply of fuel to the heating means or burner (not shown) of the vessel 10 when the temperature of the fluid in the vessel becomes excessive.

Following the actuation of the safety control, as described above, the temperature of the fluid in the vessel 10 drops and the material 50 solidifies. The thermally responsive control may then be reset or reconditioned. To reset the safety control following the solidification of the fusible material 50 the lever 44 is engaged and turned through an arc of substantially 180°. This turns the actuator 13 and the head 45 and the engagement of the face 46 with the pitched or inclined disc 48 cams or shifts the actuator 13 outwardly. When the actuator 13 is turned by manipulation of the lever 44, as just described, the head 45 is brought to a position such as illustrated in Fig. 4 of the drawings where the end 46 is angularly related to the pitched disc 48 and engages the periphery of the disc. Outward movement of the stem or actuator 13 by the camming of the end 46 with the disc 48 brings the valve disc 24 to an open position where the washer 27 is spaced from the seat 21 to provide for a free flow of fuel through the valve passage 16. It is to be observed that the safety control may be easily and quickly reset when the temperature of the fluid in the vessel 10 falls below a critical temperature.

Fig. 5 of the drawings illustrates another form or type of valve 11a associated with or combined with the safety control of the invention. The valve 11a illustrated in Fig. 5 is adapted to control the supply of fuel to the pilot burner (not shown) of a water heater, or the like, although it will be apparent that the valve 11 has other uses. The thermally responsive control as employed in connection with the valve 11a may be the same as described above. Accordingly, I have shown only the body tube 33 and the stem or actuator 13 associated with the valve 11a, it being understood that the other elements of the thermally responsive control may be the same as above described.

The valve 11a includes a valve body 60 provided with a central chamber 61. A threaded plug 62 closes the outer end of the chamber 61. An inlet port 63 is provided in the wall of the body 60 to communicate with the outer end of the chamber 61 and an outlet port 64 is provided in the body wall to communicate with the inner part of the chamber 61. The outer portions of the ports 63 and 64 may be enlarged and threaded for the reception of pipe or conduit parts for handling the fuel. A partition 65 extends transversely through the chamber 61 at a point spaced between the ports 63 and 64 and has a central opening 66. A raised valve seat 67 of the knife-edge type is provided on the outer side of the partition 65 in surrounding relation to the opening 66. The stem or actuator 13 extends through an opening 68 in the rear wall of the body 60 and continues through the opening 65. A boss 31a is provided to facilitate the mounting of the valve 11a on a boiler tank, heating vessel, or the like. The boss 31a is spaced from the rear side of the valve body 60 and the valve body and the boss are connected by a web 32a similar to the web 32 described above. The boss 31a carries the body tube 33 of the body 12 and is adapted to be threaded in an opening in the wall of a boiler tank or heating vessel so that the tube 33 containing the actuator 13 and member 14 extends into the vessel.

The valve 11a further includes a valve disc 69 in the outer portion of the chamber 61. The valve disc 69 is similar to the above described disc 24 and carries a washer 70 for sealing with the seat 67. The washer 70 is formed of flexible resilient material and is sprung into a groove 71 in the inner portion of the disc 69. The engagement of the washer 70 in the groove 71 retains the washer in place and the washer may evenly lie against the flat face of the disc 69. The periphery of the washer 70 is preferably free and unconfined. The sealing washer 70 opposes the seat 67 and is adapted to cooperate with the seat to stop the flow of fluid through the valve 11a. A spring 72 is arranged under compression between the plug 62 and the valve disc 69 to urge the valve disc to the closed position.

A socket 73 in the disc 69 receives the forward end portion of the stem or actuator 13. The bottom wall of the socket 73 engages the end of the actuator 13 so that the spring 72 urges the actuator inwardly. The valve disc 69 preferably has a certain amount of play or freedom on the actuator 13 so that the valve washer 70 may evenly engage the seat 67. Means is provided for sealing about the stem or actuator 13 to prevent the leakage of fuel from the valve body 60. A packing assembly 74 surrounds the actuator 13 and bears against the rear wall of the valve body 60. A spring 75 is arranged under compression between the valve disc 69 and the packing assembly 74 to maintain the packing assembly under compression to properly seal about the actuator 13. The spring 72 is considerably stronger than the spring 75 and is operable to move the valve disc 69 against the resistance offered by the spring 75.

When the temperature of the fluid in the vessel with which the valve 11a is associated is below the critical point the fusible material 50 is in a solid state and the engagement of the end 46 with the periphery of the disc 48 holds the actuator 13 in a position where the valve disc 69 is spaced from the seat 67 to provide for the flow of fluid through the valve 11a. If, for any reason, the temperature of the fluid in the vessel approaches or reaches the critical point the fusible material 50 melts or liquefies and the spring 72 acting on the actuator 13 through the medium of the valve disc 69 causes the member 14 to shift or turn to a position where the flat face of its disc 48 is parallel with or engaged flatly by the end 46. This shifting of the member 14 is accompanied by movement of the valve disc 69 to the closed position where the washer 70 seals with the seat 67. When the temperature of the fluid in the tank or vessel drops the material 50 solidifies and the member 13 may be turned by means of the lever 44, as described above, to reset the control means and to open the valve 11a and thus condition the safety control for further operation.

In Fig. 6 of the drawings I have illustrated a form and application of the invention for the control of an electrical circuit. The electrical circuit governed by the control means of the invention may energize or control a relay, signal means, valve means, etc. The control illustrated in Fig. 6 is in the nature of a closed circuit control, that is, the operation of the control effects the opening of the electrical circuit. It is to be understood that the thermally responsive control of the invention may be utilized to close a normally open circuit.

In Fig. 6 I have illustrated the tube body 33 and the stem or actuator 13 which may be as described above, and which will be assumed as related to the other elements of the thermally responsive control, as described in the form of the invention illustrated in Figs. 1 to 4 of the drawings.

The structure illustrated in Fig. 6 includes a body or housing 80 provided with a removable front cover plate 81. A boss 31b is provided for mounting the housing 80 on a tank, boiler or the vessel of a heater, or the like. The boss 31b may be identical with the boss 31 described above, and may be connected with the rear wall of the housing 80 by a web 32b. The boss carries the body tube 33 and the stem or actuator 13 extends forwardly from the boss 31b into the housing 80. As illustrated, the actuator 13 may shiftably pass through an opening 82 in the rear wall of the housing 80.

The electrical circuit to be controlled may comprise two insulated electrical conductors 83. Bushings 84 of insulating material are threaded or otherwise secured in openings in the plate 81 and binding posts 85 are threaded through the bushings 84 to project into the housing 80. The conductors 83 are suitably secured to the projecting outer portions of the binding posts 85. A contact element 86 is provided for normally completing the circuit between the binding posts 85. The contact element 86 is a shiftable part arranged within the housing 80 and adapted to engage the inner ends of the posts 85. The element 86 may be in the nature of a plate, disc or strip of suitable conducting material. A substantially central disc or block 87 of insulating material is carried by the contact element 86 and a spring 90 is arranged under compression between the plate 81 and the block 87 to urge the contact element 86 rearwardly or away from the posts 85. The socket 88 in the insulating block 87 turnably receives the forward end portion of the stem or actuator 13. The bottom wall of the socket 88 engages the end of the actuator 13 so that the spring 90 acting rearwardly against the block 87 tends to move the actuator 13 inwardly or rearwardly. The engagement of the end 46 with the periphery of the disc 48 normally holds the stem or actuator 13 in a position where the contact element 86 is in engagement with the posts 85. The spring 90 acting on the actuator 13 through the medium of the block 87 is operable to cause movement or turning of the member 14 when the material 50 melts or fuses.

It is believed that the operation of the structure shown in Fig. 6 will be readily understood from the foregoing detailed description. Under normal conditions the engagement of the end 46 with the disc 48 holds the contact element 86 against the ends of the posts 85 to maintain the electrical circuit in a closed condition. When a given or critical temperature is reached in the tank or vessel with which the control is associated the material 50 liquefies and the spring 90 urges the actuator 13 rearwardly so that the engagement of the end 46 with the periphery of the disc 48 turns the member 14. Simultaneously with the moving or turning of the member 14 the actuator 13 moves rearwardly and the contact element 86 moves out of engagement with the posts 85 to open the electrical circuit. Following the lowering of the temperature in the vessel or container and the solidification of the material 50 the actuator 13 may be turned by means of the lever 44, as described above to restore the parts to the normal positions illustrated.

Having described only typical preferred forms and applications of my invention, I do not wish to be limited or restricted to the specific details herein set forth, but wish to reserve to myself any variations or modifications that may appear Having described my invention, I claim:

1. A thermally responsive control of the character described comprising two elements related for relative turning and for relative longitudinal movement, a member cooperating with one of said elements normally preventing relative longitudinal movement of the members and turnable to allow relative longitudinal movement between the elements, fusible material bonding the member to the other element restraining turning of the member to hold the elements against relative movement and liquefiable at a given temperature to allow turning of the member, and manual means for turning the first named element relative to the member when said material is re-solidified to return the elements to their initial positions.

2. A thermally responsive control of the character described comprising, two elements related for relative turning and relative longitudinal movement, means tending to cause relative longitudinal movement between the elements, a member interposed between the elements, cam parts on the member and one of said elements cooperable to prevent relative longitudinal movement between the elements, operable under the action of said means to cause turning of the member and allow relative longitudinal movement of the elements in one direction and operable upon turning of said element to produce relative longitudinal movement of the elements in the other direction, fusible material normally holding the member against turning and fusible at a given temperature to allow turning of the member, and manual means for turning said element when said material is re-solidified so that the cam parts produce relative longitudinal movement of the elements in said other direction to restore the elements to their initial positions.

3. A thermally responsive control including two relatively turnable and longitudinally movable elements, one a body, the other an actuator, means tending to cause relative longitudinal movement between the elements, a movable member, fusible material normally securing the member against movement relative to one of the elements and meltable at a given temperature to allow such movement, parts on the other element and the member engaging to prevent relative longitudinal movement between the elements while the said material remains in a solid state, operable under the influence of said means to cause movement of the member and to allow relative longitudinal movement of the elements when said material liquefies and operable upon relative turning of the elements when said material is re-solidified to cause relative longitudinal movement of the elements to their initial relative positions, and means for turning one element relative to the other to restore the elements to their initial positions.

4. A thermally governed control including two elements related for relative turning and longitudinal movement, one a body, the other a control part, a member tiltably carried by one element, fusible means securing the member to said element to hold the member against tilting, a part on the other element engaging the member to hold the elements against relative longitudinal movement, means tending to cause relative longitudinal movement between the elements and urging said part against the member whereby said part tilts the member when the fusible means is fused to allow relative longitudinal movement between the elements, and manual means for turning one element relative to the other when the fusible means is re-solidified to restore the elements to their initial positions.

5. A thermally governed control including two elements related for relative longitudinal movement on a common axis, one a body, the other a control part, a member turnably carried by one element, fusible material holding the member against turning, means tending to cause relative shifting between the elements, and engaging cam parts on the member and said other element holding the elements against movement when the fusible material is in a solid state and pitched relative to said axis to cause turning of the member and thus allow relative movement between the elements when the fusible material melts.

6. A thermally governed control comprising two elements, one a control part, the other a body housing the control part, the elements being related for relative longitudinal movement on a given axis, a member turnable in the body, fusible material holding the member against turning, a face on the control part engaging the member at a point offset from its axis of turning and holding the elements against relative movement, the face being pitched relative to the first named axis, and means urging the face against the member to cause turning of the member and relative longitudinal movement between the elements upon liquefying of the fusible material.

7. A thermally governed control comprising two elements, one a control part, the other a body housing the control part, the elements being related for relative movement, the body having a socket, a ball turnable in the socket, fusible material holding the ball against turning, a projection on the ball engaged by the control part, and means tending to cause relative movement between the elements in a direction to urge the projection and control part together whereby melting of the fusible material results in turning of the ball and relative movement between the elements.

8. A thermally governed control comprising two elements, one a control part, the other a body housing the control part, the elements being related for relative movement, the body having an opening, a ball turnable in the opening, fusible material in the opening normally holding the ball against turning, a disc on the ball, a pitched face on the control part normally engaging the disc to hold the elements against relative movement in one direction and angularly related to the disc, and means tending to cause relative movement between the elements whereby the engagement of the pitched face with the disc turns the ball to bring the disc to a position substantially parallel with the face and thus allow relative movement between the elements when the fusible material melts.

9. A thermally governed control comprising two elements, one a control part, the other a body housing the control part, the elements being related for relative movement, the body having an opening, a ball turnable in the opening, fusible material in the opening normally holding the ball against turning, a disc on the ball, a pitched face on the control part normally engaging the disc to hold the elements against relative movement in one direction and angularly related to the disc, and means tending to cause relative movement between the elements whereby the engagement of the pitched face with the disc turns the ball to bring the disc to a position substantially parallel with the face and thus allow relative movement between the elements when the fusible material melts, the ball fitting the opening to retain the melted material in the opening.

10. A thermally governed control comprising two elements, one a control part, the other a body housing the control part, the elements being related for relative movement, the body having an opening, a ball turnable in the opening, fusible material in the opening normally holding the ball against turning, a disc on the ball, a pitched face on the control part normally engaging the disc to hold the elements against relative movement in one direction and angularly related to the disc, and means tending to cause relative movement between the elements whereby the engagement of the pitched face with the disc turns the ball to bring the disc to a position substantially parallel with the face and thus allow relative movement between the elements when the fusible material melts, the elements being relatively turnable whereby the disc and face may be brought to an angular relation following resolidifying of the fusible material to reset the control for further operation.

11. In a thermally responsive control, an element having an opening, a ball turnable in the opening, fusible material in the opening holding the ball against turning when in a solid state, the ball fitting the opening to retain the material in the opening when the material is in a liquid state, a projection on the ball, and a spring urged control element engaging against the projection to be held against movement thereby and to cause turning of the ball when the said material becomes liquid.

12. A control of the character described including a body, a tube carried by the body, a block carried by the tube and having a socket, a ball turnably fitting the socket, fusible material in the socket normally holding the ball against movement, a disc rigid with the ball and normally pitched, a turnable longitudinally movable stem extending into the tube, a spring urging the stem inwardly in the tube, and an inclined end face on the stem normally pitched with respect to the disc and engaging the periphery of the disc whereby the spring acts to turn the ball and shift the stem inwardly when the said material melts.

13. A control of the character described including a body, a tube carried by the body and having a socket, a ball turnably fitting the socket, fusible material in the socket normally holding the ball against movement, a disc rigid with the ball and normally pitched, a shiftable and turnable stem extending into the tube, a spring urging the stem inwardly in the tube, an inclined end face on the stem normally pitched with respect to the disc and engaging the periphery of the disc whereby the spring acts to turn the ball and shift the stem when the said material melts, and a manual lever on the stem for turning the stem after re-solidifying of the material so that said disc and face cooperate to cam the stem to its initial position.

14. In a thermally responsive control, a turnable and longitudinally shiftable control element, a surface on the element pitched relative to the axis of turning of the element, fusible metal means engaged by said surface to normally prevent movement of the element and adapted when subjected to increased temperature to allow shifting of the element, and means for turning the element when the fusible metal means is again subjected to normal temperatures so that the cooperation of said surface with the fusible metal means restores the element to its normal position.

MEARL W. GATHERCOLE.